(12) United States Patent  
Etchegoyen (10) Patent No.: US 8,892,642 B2  
(45) Date of Patent: Nov. 18, 2014

(54) COMPUTER-BASED COMPARISON OF HUMAN INDIVIDUALS

(71) Applicant: Uniloc Luxembourg, S.A., Luxembourg (LU)

(72) Inventor: Craig S. Etchegoyen, Plano, TX (US)

(73) Assignee: Uniloc Luxembourg S.A., Luxembourg (LU)

( * ) Notice: Subject to any disclaimer, the term of this patent is extended or adjusted under 35 U.S.C. 154(b) by 0 days.

(21) Appl. No.: 13/916,945

(22) Filed: Jun. 13, 2013

(65) Prior Publication Data

US 2013/0275442 A1 Oct. 17, 2013

Related U.S. Application Data

(63) Continuation of application No. 13/743,162, filed on Jan. 16, 2013, now Pat. No. 8,521,874.

(60) Provisional application No. 61/601,010, filed on Feb. 20, 2012.

(51) Int. Cl.
  *G06F 15/16* (2006.01)
  *G06F 17/30* (2006.01)
  *H04L 12/26* (2006.01)
  *H04L 29/08* (2006.01)

(52) U.S. Cl.
  CPC .......... *G06F 17/30386* (2013.01); *H04L 43/04* (2013.01); *H04L 67/22* (2013.01); *H04L 67/303* (2013.01); *H04L 67/306* (2013.01)
  USPC ....................................................... 709/203

(58) Field of Classification Search
  USPC ....................................................... 709/203
  See application file for complete search history.

(56) References Cited

U.S. PATENT DOCUMENTS

| | | | |
|---|---|---|---|
| 4,319,085 A | 3/1982 | Welch et al. |
| 6,138,155 A | 10/2000 | Davis et al. |
| 6,167,517 A | 12/2000 | Gilchrist et al. |
| 6,173,283 B1 | 1/2001 | Kasso et al. |
| 6,195,447 B1 | 2/2001 | Ross |
| 6,754,665 B1 | 6/2004 | Futagami et al. |
| 7,272,728 B2 | 9/2007 | Pierson et al. |
| 7,283,166 B1 | 10/2007 | Moon et al. |
| 7,319,987 B1 | 1/2008 | Hoffman et al. |

(Continued)

FOREIGN PATENT DOCUMENTS

WO WO 2010/104928 9/2010

OTHER PUBLICATIONS

Gupta et al., "Efficient Fingerprint-based User Authentication for Embedded Systems," *Proceedings of the 42nd Annual Design Automation Conference*, New York City, New York, 2005.

(Continued)

*Primary Examiner* — Larry Donaghue
(74) *Attorney, Agent, or Firm* — Sean D. Burdick (57) ABSTRACT

A test person is compared to a reference person by comparing detailed information regarding the configuration, capabilities and usage of computers—such as installed hardware devices, makes and models and firmware versions of such hardware devices, installed software, versions of installed software, and usage logs—used by the respective individuals. In effect, each person's computer is considered a proxy for the person herself, representing countless purchasing, maintenance, pastime choices in the configuration and use of a thoroughly complex personal and professional tool.

14 Claims, 7 Drawing Sheets

(56) References Cited

U.S. PATENT DOCUMENTS

| | | | |
|---|---|---|---|
| 7,523,860 B2 | 4/2009 | Bonelle et al. | |
| 7,590,852 B2 | 9/2009 | Hatter et al. | |
| 7,617,231 B2 * | 11/2009 | Moon et al. | 707/999.102 |
| 7,739,402 B2 | 6/2010 | Roese | |
| 7,827,186 B2 | 11/2010 | Hicks | |
| 7,970,946 B1 * | 6/2011 | Djabarov et al. | 709/248 |
| 8,190,475 B1 | 5/2012 | Merrill | |
| 8,255,948 B1 | 8/2012 | Black et al. | |
| 8,326,001 B2 | 12/2012 | Free | |
| 8,635,087 B1 | 1/2014 | Igoe et al. | |
| 2003/0163483 A1 | 8/2003 | Zingher et al. | |
| 2004/0030912 A1 | 2/2004 | Merkle et al. | |
| 2004/0143746 A1 | 7/2004 | Ligeti et al. | |
| 2004/0187018 A1 | 9/2004 | Owen et al. | |
| 2005/0010780 A1 | 1/2005 | Kane et al. | |
| 2005/0187890 A1 | 8/2005 | Sullivan | |
| 2005/0278542 A1 | 12/2005 | Pierson et al. | |
| 2006/0161914 A1 | 7/2006 | Morrison et al. | |
| 2006/0282660 A1 | 12/2006 | Varghese et al. | |
| 2007/0050638 A1 | 3/2007 | Rasti | |
| 2007/0219917 A1 | 9/2007 | Liu et al. | |
| 2007/0234409 A1 | 10/2007 | Eisen | |
| 2007/0239606 A1 | 10/2007 | Eisen | |
| 2007/0294403 A1 | 12/2007 | Verona | |
| 2008/0027858 A1 | 1/2008 | Benson | |
| 2008/0028455 A1 | 1/2008 | Hatter et al. | |
| 2008/0040802 A1 | 2/2008 | Pierson et al. | |
| 2008/0092058 A1 | 4/2008 | Afergan et al. | |
| 2008/0109491 A1 | 5/2008 | Gupta | |
| 2008/0120195 A1 | 5/2008 | Shakkarwar | |
| 2008/0212846 A1 | 9/2008 | Yamamoto et al. | |
| 2008/0215623 A1 | 9/2008 | Ramer et al. | |
| 2008/0235375 A1 | 9/2008 | Reynolds et al. | |
| 2009/0089869 A1 | 4/2009 | Varghese | |
| 2009/0150330 A1 | 6/2009 | Gobeyn | |
| 2009/0254476 A1 | 10/2009 | Sharma et al. | |
| 2009/0292743 A1 | 11/2009 | Bigus et al. | |
| 2010/0125911 A1 | 5/2010 | Bhaskaran | |
| 2010/0185871 A1 | 7/2010 | Scherrer et al. | |
| 2010/0235241 A1 | 9/2010 | Wang et al. | |
| 2010/0305989 A1 | 12/2010 | Mu et al. | |
| 2011/0040825 A1 | 2/2011 | Ramzan et al. | |
| 2011/0179176 A1 | 7/2011 | Ravichandran et al. | |
| 2011/0302003 A1 | 12/2011 | Shirish et al. | |
| 2011/0319060 A1 | 12/2011 | Gentemann | |
| 2012/0041969 A1 | 2/2012 | Priyadarshan et al. | |
| 2012/0063427 A1 | 3/2012 | Kandekar et al. | |
| 2012/0233665 A1 | 9/2012 | Ranganathan et al. | |
| 2013/0167195 A1 * | 6/2013 | Etchegoyen | 726/3 |

OTHER PUBLICATIONS

"German Stores Put Money at Your Fingertips", Independent On-line, Sep. 4, 2007.

"Lowes Foods Brings Biometric Payments and Check Cashing to Its Customers," Banking & Financial Solutions, Bioguard Components & Technologies Ltd, Feb. 7, 2005.

"Pay by Touch," From Wikipedia, Feb. 22, 2011, 2 pages.

Agbinya et al., "Development of Digital Environment Identity (DEITY) System for On-line Access," Third International Conference on Broadband Communications, Information Technology & Biomedical Applications, Third International Conference on IEEE, Piscataway, New Jersey, Nov. 23, 2008, 8 pages. XP031368250.

Johnson et al. "Dimensions of Online Behavior: Toward a User Typology," *Cyberpsychology and Behavior*, vol. 10, No. 6, pp. 773-779, 2007. XP002617349.

Kurchak, Kent, "Notes Application Strategies: User Activity Tracking," Mar. 14, 2004, 14 pages.

Lemos, Robert, "Fingerprint Payments Taking Off Despite Security Concerns," *Security Focus*, Oct. 10, 2007, 3 pages.

Sim et al. "Continuous Verification Using Multimodal Biometrics", *IEEE Transactions on Pattern Analysis and Machine Intelligence*, vol. 29, No. 4, Apr. 1, 2007, IEEE Service Center, Los Alamitos, CA, pp. 687-700. XP011168507.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Lee et al., "Analogous Content Selection Mechanism Using Device Profile and Content Profile for U-Learning Environments," 2009 Ninth IEEE International Conference on Advanced Learning Technologies, IEEE Computer Society.

Fraga, David, "Information Technology, Regime Stability and Democratic Meaningfulness: A Normative Evaluation of Present and Potential Trends," Honor's Thesis for a Degree for College Undergraduate Research, University of Pennsylvania, Mar. 30, 2007, 73 pages.

Soto, Lucy, "Not-so-Private Web: Information Leaks on Social Networks Can Leave Users Vulnerable," *The Atlanta Journal-Constitution*, Feb. 14, 2010, 3 pages.

Keane et al. "Transistor Aging," IEEE Spectrum, Apr. 25, 2011.

* cited by examiner

COMPUTER-BASED COMPARISON OF HUMAN INDIVIDUALS

This application is a continuation of U.S. application Ser. No. 13/743,162, filed Jan. 16, 2013, which claims priority to U.S. Provisional Application No. 61/601,010, which was filed Feb. 20, 2012, and which is fully incorporated herein by reference.

BACKGROUND OF THE INVENTION

1. Field of the Invention

The present invention relates generally to computer network services and, more particularly, to methods of and systems for computer-based comparison of human individuals.

2. Description of the Related Art

Generally, people prefer to be well-informed when making decisions. Hiring decisions, in particular, can be very difficult because personalities are complex and can be very difficult to understand. It is especially challenging to predict a prospective employee's capacity to perform the requirements of a particular job based on information contained in a self-serving resume and whatever the interviewer may glean from a personal interview. From time to time, however, employers roll the dice and choose a candidate for a professional role with an appreciable degree of uncertainty. The same difficulties exist outside the workplace when anyone needs to hire an expert such as a doctor, a lawyer, a mechanic, or some other professional. Even in social networking, when choosing people as friends or for other relationships, the choice is often influenced by a hunch as much as by intimate knowledge of facts.

Of course, computers provide tremendous advantages in making quick and accurate decisions based on large numbers of facts. However, facts about people tend to be superficial, at best, and also largely confidential. Facts tend to be superficial in that the facts are often demographic in nature or representing public affiliations that say little, if anything, about a person. Such public affiliations can include things like professional and academic associations, activity club memberships and participation in public forums or with various interest groups.

As information about a person becomes more closely tied to the individual, the information becomes more private and privacy concerns interfere with the ability to make a more complete assessment of the person.

What is needed is a computer-based technique for assessing a human personality by comparison of his or her attributes to those of another known person in such a way that protects the privacy of the people involved.

SUMMARY OF THE INVENTION

In accordance with the present invention, a test person is compared to a reference person by comparing detailed information regarding the configuration, capabilities and usage of computers used by the respective individuals. In effect, each person's computer is considered a proxy for the person herself, representing countless purchasing, maintenance, pastime choices in the configuration and use of a thoroughly complex personal and professional tool.

The information gathered for each computer includes configuration and capability data, including (i) hardware components such as installed hardware devices, makes and models and firmware versions of such hardware devices, (ii) hardware configuration such as system data specifying that the hardware components are to behave in a particular way, (iii) software components such as installed software, versions of installed software, (iv) software configuration such as system menu organization and software settings, and (v) usage data such as usage logs and usage histories. Typically, hardware and software components and configuration of a computer is not a privacy concern for the user.

The data can be gathered from each user's computer locally or by cooperation with a server computer for which the user's computer is a remotely located networked client computer. Information provided by the gathered data is used to create a profile of the capabilities and usage of the known user's computer in relation to that of a target computer profile previously created from data gathered from the computer of the preselected individual.

This comparison enables better-informed decisions about the unknown user, which, in one embodiment can be helpful in making hiring decisions where the unknown user is a job applicant and the previously selected individual is a highly regarded employee. In other embodiments capabilities and usage profile of the user's computer is compared to profiles other than work-related profiles, including desirable profiles as well as undesirable or unsuitable profiles.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

Figure 1:
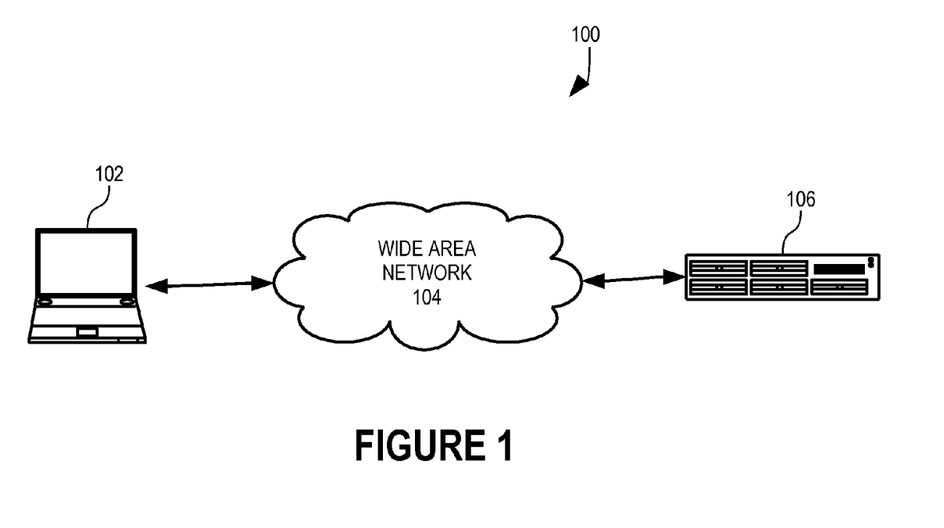
FIG. 1 is a diagram showing a client computer device and a server computer that cooperate to create a profile of the capabilities and usage of the client computer in accordance with one embodiment of the present invention.

In accordance with the present invention, data collected from a computer is used to create a profile of its capabilities and usage to compare its user to a preselected individual. The data can be collected from the computer locally or by cooperation with a server computer for which the user's computer is a remotely located networked client computer. In an embodiment where the computer to be profiled is remotely located, such as client computer device 102, server 106 uses (i) the data it receives representing the capabilities and usage of client computer device 102 and (ii) a reference profile of the capabilities and usage of the computer of a preselected reference individual, to compare the user of client computer device 102 to the reference individual.

Client computer device 102 can be any of a number of types of computer devices, including smartphones, tablets, netbooks, laptops, and desktops. Computer devices are work tools and it is believed that individuals with similar work habits use their work tools in similar manners. Accordingly, computer devices having similar configurations, capabilities, and usage are a strong indicator that their respective users have similar work habits. Beyond work habits and work tools, computer devices are also used for personal activities and are therefore also good indicators of similarities of individuals in contexts other than work.

Sources of the information gathered from client computer device 102 include data provided by hardware devices installed, system configuration files, and records of the user's usage, including network activity. Hardware, including computer chips, storage devices, phone components, user input/output devices, cables, and audio components of smartphones, netbooks, tablets, laptops and desktop varies significantly by price, function and capability. While these variations certainly are found between categories of computers, these variations are also significant within a given category of computer. Software found on various computer devices also varies significantly by price, function and capability and according to computer device category as well as within each category. Such software includes operating systems, browsers and mini-browsers, games, work-related programs including software used by various professionals, music, and photo and video editors among many other possible capabilities. Records of network activity include bookmarks, downloads, history of web sites visited and the number of visits to each site.

The possible variations in hardware and software are so great that it is unlikely that two computer devices within the same computer device category—for example, two laptops—which happen to have exactly the same hardware and software components when new will continue to do so for very long. As a result, a client computer device with components that are very similar to those of computer device of a preselected, reference individual is quite significant. And, just as with the hardware and software of the client computer device, records of local and network activity of the user of a client computer device that are closely similar to those of the computer used by the reference individual also can be expected to infer that the user has very similar personal characteristics to those of the reference individual.

In a manner described more completely below, in a work-related example server 106 processes the system information collected by client computer device 102 from its hardware and software configurations and use records and creates a profile of the user's computer. The created profile enables server 106 to compare the profile of client computer device 102 to a reference profile, e.g., the profile of a reference computer device of a reference individual which was stored previously on server 106. In an illustrative example of an embodiment of the invention, the reference individual is a highly regarded employee of a company considering hiring the user of client computer device 102.

As shown in FIG. 1, client computer device 102 and server 106 communicate with one another through a wide area network 104, which is the Internet in this illustrative example. Also in this illustrative example, the user of client computer device 102 is a job applicant who has installed on client computer device 102 human resources software from the company to which the user is applying for a job. As described below, the human resources software can be received from server 106 in a network transaction and can use one or more browser plugins to complete the task. The human resources software gathers system information about client computer device 102 in the form of data relating to its capabilities and its usage. When the applicant uses remotely located client computer device 102 to send a request to a human resources page provided by server 106, server 106 asks client computer device 102 to send the system information to server 106, which is used by the prospective employer of the user of client computer device 102.

Transaction flow diagram 200 (FIG. 2) represents the manner in which client computer device 102 and server 106 cooperate to compare a profile of client computer device 102 to a reference profiles to thereby compare the user of client computer device 102 to a reference individual in accordance with the present invention.

Figure 2:
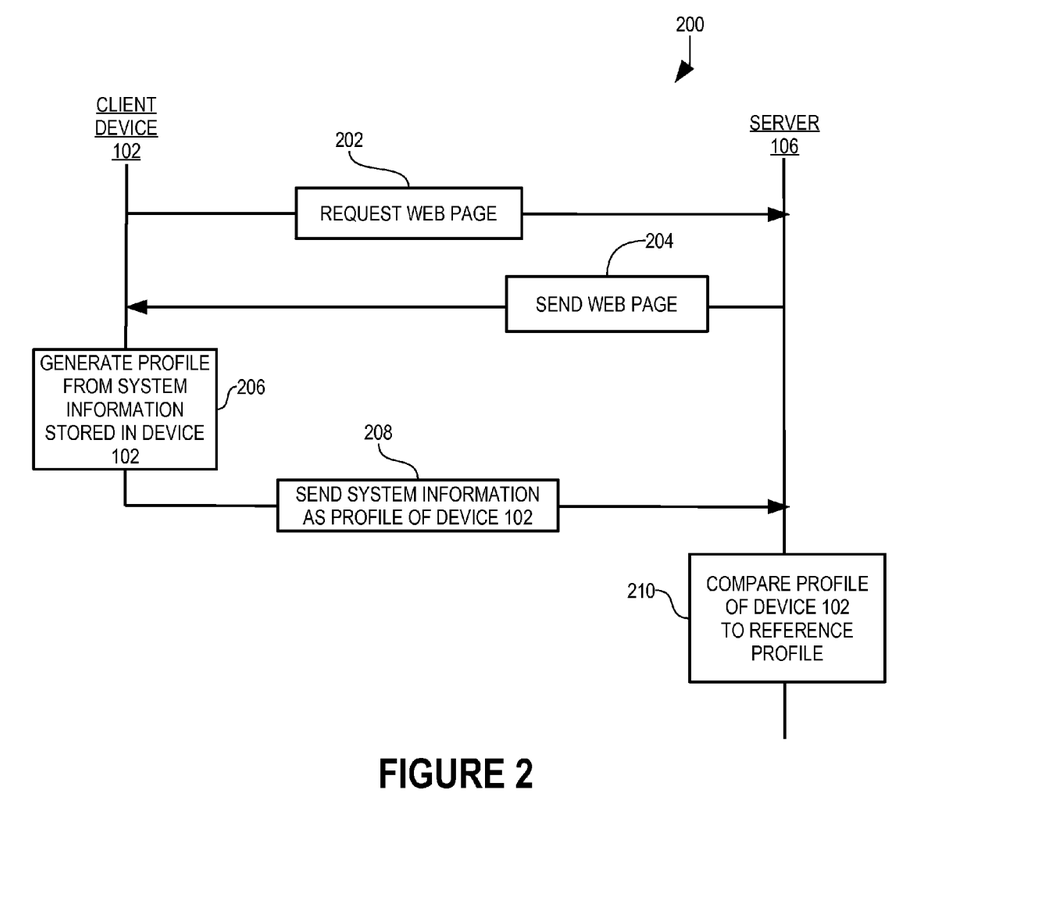
FIG. 2 is a transaction flow diagram illustrating the manner in which the remotely located client computer and server computer of FIG. 1 cooperate to create a profile of the capabilities and usage of the client computer in accordance with one embodiment of the invention.

In step 202, client computer device 102 sends a request for a specific web page to server 106, such as a human resources web page for example. The request can be in the form of a URL specified by the user of client computer 102 using a web browser 620 (FIG. 6) executing in client computer device 102 and conventional user interface techniques. Web browser 620 and user input devices and other components of client computer device 102 are described in greater detail below.

Figure 6:
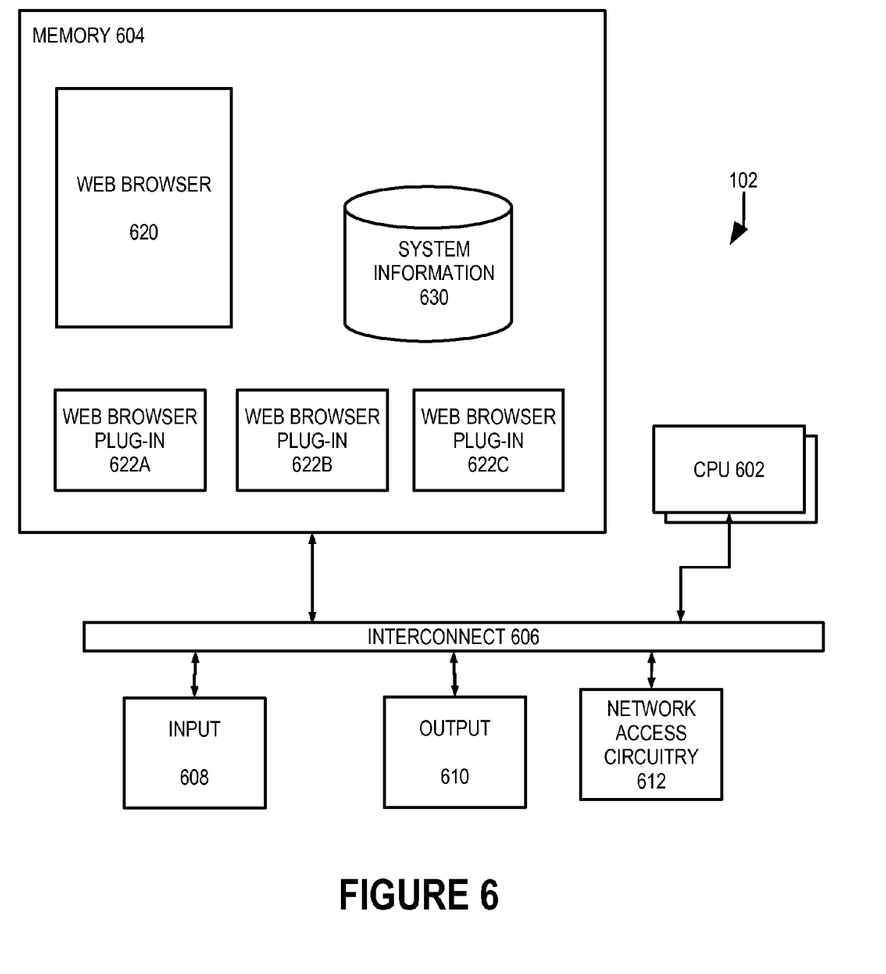
FIG. 6 is a block diagram showing in greater detail the remotely located client computer of FIG. 1, including data relating to its capabilities and usage.

In step 204 (FIG. 2), server 106 sends a web page that is identified by the request received in step 202. The web page sent to client computer device 102 includes content that causes web browser 620 of client computer device 102 to generate in step 206 a device profile of the configuration, capabilities and usage, including hardware and software components and configuration and local and network activity, for client computer device 102 from system information 630 (FIG. 6). In one embodiment, a web browser plug-in 622C is installed in client computer device 102 and, invoked by web browser 620, generates the capabilities and usage of client computer device 102 from system information 630.

Other items of system information can be requested of hardware components of client computer device 102 and included in system information 630. For example, models and capabilities of storage devices and graphics devices can be retrieved from the storage devices and graphics devices themselves as needed. Such querying of hardware components of a computer is known and not described herein.

In addition to hardware components and installed software of client computer 102, system information 630 can include software stored in client computer device 102 that is not yet installed. Such nascent software can be identified as files stored in a file system of client computer device 102. Other contents of the file system of client computer device 102 can be included in personal information 630. For example, music, video, and other media stored in a computer can be indicative of personal characteristics of the user. Records of network activity on client computer device 102 which include dates can be used to also track changes in network activity, affecting the profile of the user.

The various elements of client computer device 102 and their interaction are described more completely below. In addition, step 206 is described more completely below with respect to logic flow diagram for step 206 (FIG. 3).

In step 208 (FIG. 2), client computer device 102 sends to server 106 device profile generated in step 206 including the capabilities and usage of client computer device 102.

Figure 4:
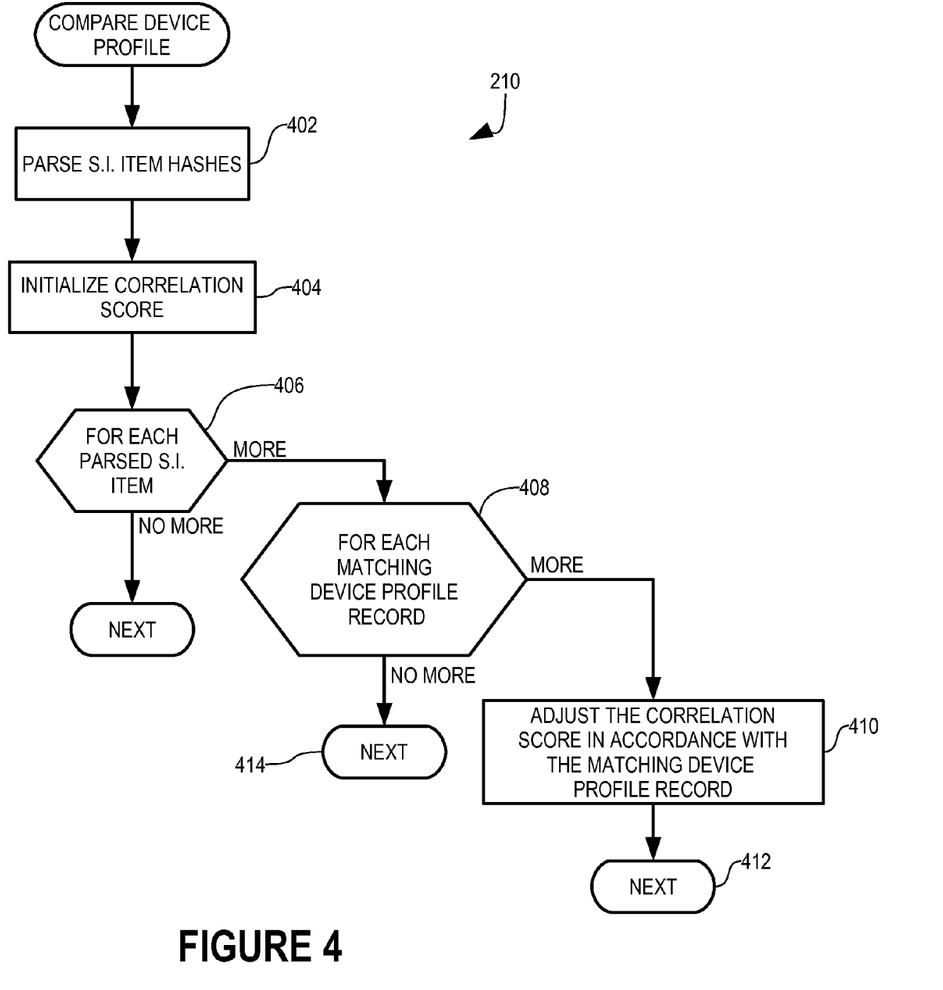
FIG. 4 is a logic flow diagram illustrating a manner in which the server computer compares a profile of the capabilities and usage of the client computer device to a profile of a reference computer device to provide a measure of similarity between the client computer device and the reference computer device.

In step 210, server 106 compares the one or more characteristics of the profile of client computer device 102 from the system information received to a reference computer device profile in step 208. The result of such comparison is a measure of correlation between client computer device 102 and a reference computer device and, therefore, a measure of correlation between the user of client computer device 102 and the user of a reference computer device. Step 210 is described in greater detail below in conjunction with logic flow diagram 210 (FIG. 4).

Figure 3:
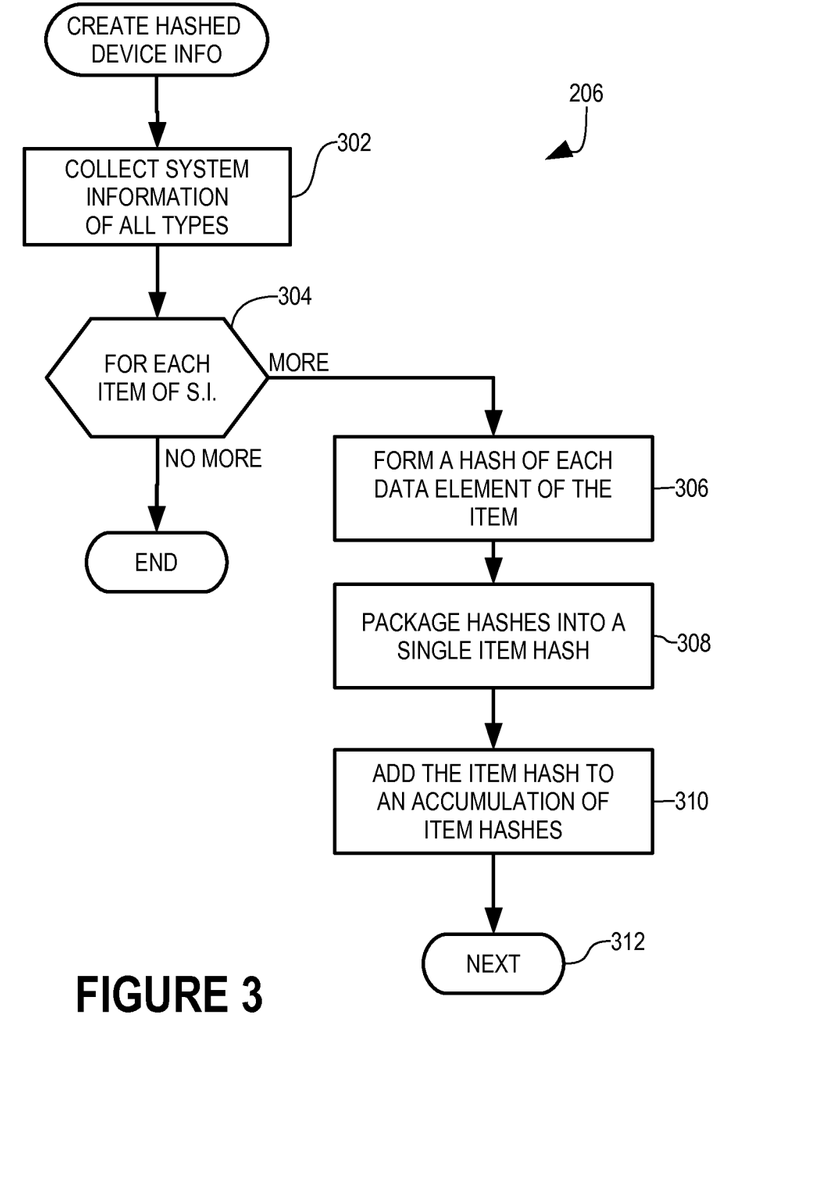
FIG. 3 is a logic flow diagram illustrating a step of the transaction flow diagram of FIG. 2 in greater detail.

As described above, client computer device 102 generates a record of its capabilities and usage from system information 630 (FIG. 6) in step 206 (FIG. 2), and step 206 is shown in greater detail as logic flow diagram 206 (FIG. 3). In this illustrative embodiment, step 206 is performed by web browser plug-in 622C (FIG. 6).

In step 302 (FIG. 3), web browser plug-in 622C collects information relating to the capabilities and usage of computer client device 102 from system information 630, which includes a number of items of network activity and the hardware and software of client computer device 102, each having a type and a value. Item types can include generally any type of network and local activity and hardware and software information stored on client computer device 102 and used by web browser 620 (FIG. 6), including client computer device 102's browsing history, downloads, bookmarks, computer chips, user interface, display screen, network access circuitry or configuration, memory cards, audio components, web browser or web mini-browser, games, professional software, music, and photo editing and video editing software as examples. Such items represent user activity on client computer device 102 and system configuration choices of the user, either made directly or made indirectly in the original purchase decision, and are indicative of subjective needs and preferences of the user.

Loop step 304 and next step 312 define a loop in which web browser plug-in 622C processes each item of system information 630 in accordance with steps 306-310. The particular item of system information 630 processed by web browser plug-in 622C during each iteration of the loop of steps 304-312, is sometimes referred to herein as "the subject item."

In step 306, web browser plug-in 622C forms a reversible hash of each data element of the subject item. Each data element of the subject item is hashed by web browser plug-in 622C to hide system information during transport through wide area network 104 (FIG. 1). In particular, item type 704 (FIG. 7) of system information item record 702 is a hash of the type of the subject item, and value 706 is a hash of the value of the subject item.

Figure 7:
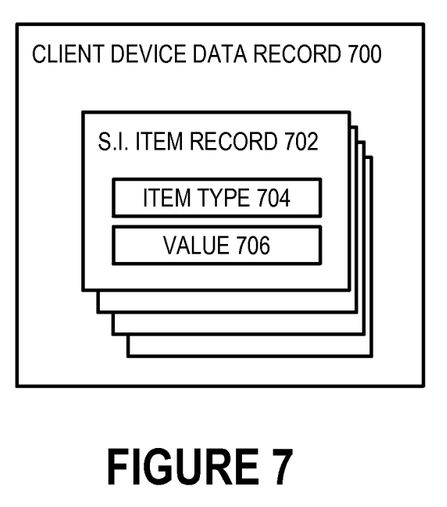
FIG. 7 is a block diagram of a profile of the capabilities and usage of a remotely located client computer in accordance with one embodiment of the present invention.

In step 308, web browser plug-in 622C packages all the reversible hashes of data elements of the subject item into a single, reversible hash representing the subject item in its entirety. Web browser plug-in 622C forms system information item record 702 as a hash of item type 704 and value 706 in this illustrative embodiment.

In step 310, web browser plug-in 622C adds the hash created in step 308 to an accumulation of data item hashes.

The accumulation of data item hashes is the hashed capabilities and usage information of client computer device 102 sent to server 106 in step 208.

Once all of the system information items 630 (FIG. 6) have been processed by web browser plug-in 622C according to the loop of steps 304-312 (FIG. 3), processing according to logic flow diagram 206, and therefore step 206 (FIG. 2), completes. The resulting profile of capabilities and usage is an accumulation of hashes that represent multiple items of system information stored on client device 102.

Figure 5:
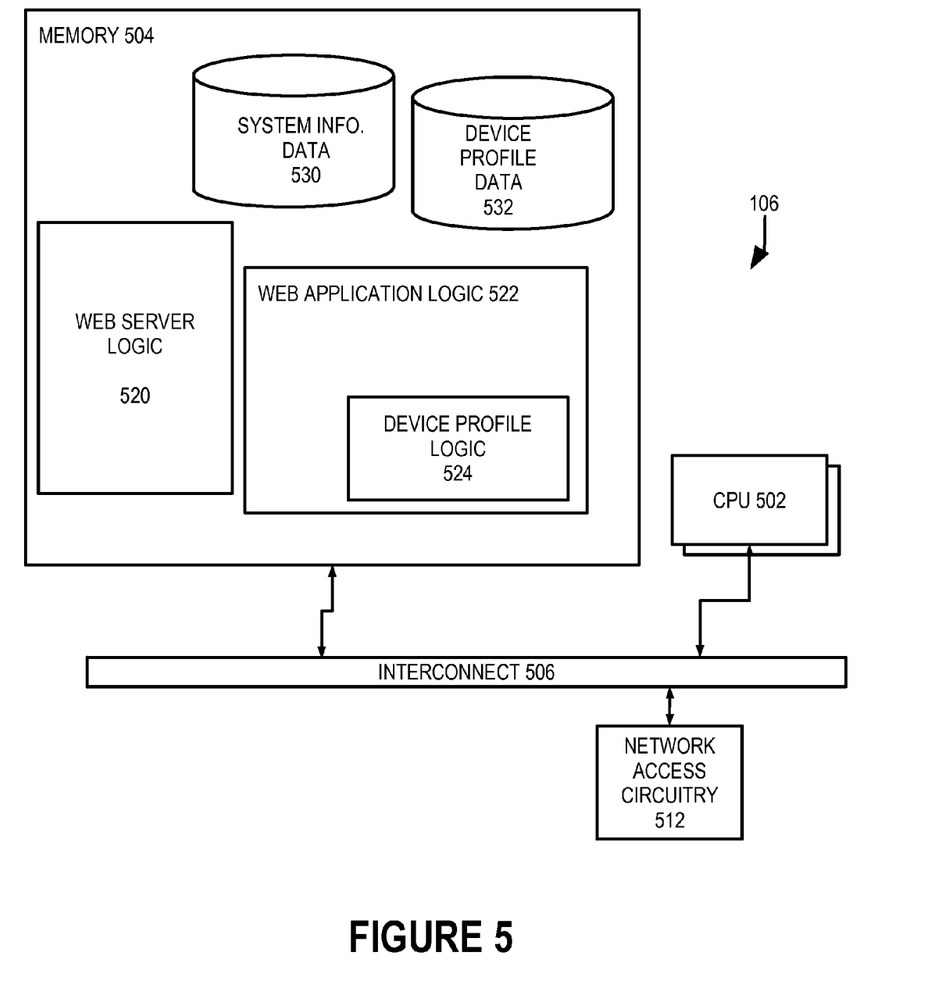
FIG. 5 is a block diagram showing in greater detail the server computer of FIG. 1, including computer profile data.

As described above, server 106 (FIG. 1) compares the profile of the user's computer device in step 210 to a reference profile. This is shown in greater detail as logic flow diagram 210 (FIG. 4). The system information is stored by server 106 as client device data record 700 (FIG. 7) in system information data 530 (FIG. 5). The reference profile is a profile of a computer device used by a reference person to which the user of client computer device 102 is to be compared. In this illustrative example of evaluating an potential employee, the reference profile can be a profile of a computer device used by a particularly good and valued employee or by a particularly bad and troublesome employee. A high degree of correlation with a good employee indicates the potential employee should be hired while a high degree of correlation with a bad employee indicates the contrary.

In step 402 (FIG. 4), device profile logic 524 parses individual reversible hashes representing whole, individual items of system information from system information data 530 and parses the reversible hashes of individual data items from each of the parsed reversible hashes.

In step 404, device profile logic 524 initializes a correlation score representing a measure of correlation between the profile of computer device 102 and the reference profile. In particular, device profile logic 524 initializes the correlation score to indicate no direct or inverse correlation.

Loop step 406 and next step 414 define a loop in which device profile logic 524 processes each system information item record 702 (FIG. 7) of client device data record 700 according to steps 408-412 (FIG. 4). During each iteration of the loop of steps 406-414, the particular system information item processed by device profile logic 524 is sometimes referred to as "the subject system information item" in the context of logic flow diagram 210. In the same context, system information record 702 represents the subject system information item. In particular, item type 704 and value 706 represent the type and value, respectively, of the subject system information item.

In loop step 408, device profile logic 524 identifies one or more matching correlation item records, such as correlation record 800 (FIG. 8), for the subject system information item. While correlation can be measured by direct numerical and textual comparison of value 706 for system information records 702 of respective profiles that match exactly, correlation record 800 allows greater flexibility in recognizing similar but not perfectly matched items of system information. Correlation record 800 matches the system information item represented by system information item record 702 (FIG. 7) if item type 704 and item type 802 (FIG. 8) are the same and application of test value 804 to value 706 with test operator 806 yields a "true" result.

Figure 8:
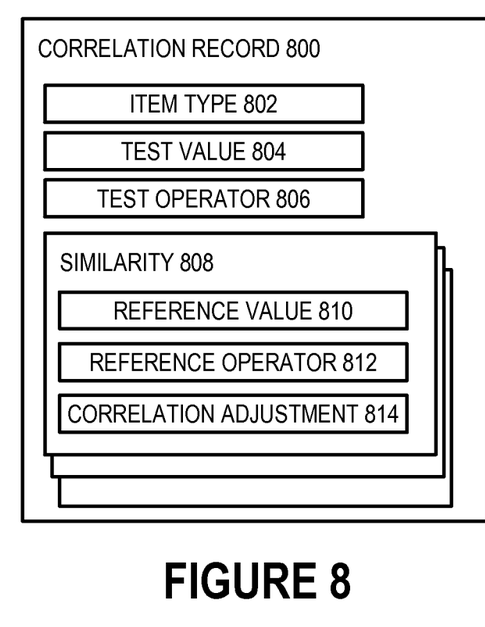
FIG. 8 is a block diagram of a correlation record used by the server computer that controls the manner in which the server computer compares a profile of the client computer's capabilities and usage in accordance with one embodiment of the invention.

It may be helpful to consider the following example. Suppose, for example, that item type 702 specifies that professional software resident on client computer device 102, test value 804 specifies a regular expression, and test operator 806 specifies a regular expression match operation. Target profile record 800 would then match system information item record 702 if item type 704 indicates the professional software and value 706, e.g., representing the name and/or version of the professional software, is matched by the regular expression of test value 804.

For each matching correlation record for the subject system information item, processing by device profile logic 524 transfers from loop step 408 to step 410.

In step 410, device profile logic 524 adjusts the correlation score according to similarity 808 (FIG. 8) of the matching correlation record. Reference value 810 represents a value 706 (FIG. 7) of a corresponding system information record of the reference profile, e.g., a system information record having a item type 704 that matches the item type of the profile of client computer device 102. Reference operator 812 specifies an operation by which reference value 810 is determined to match a value 706 of the reference profile. Reference value 810 and reference operator 812 specify which values of the reference profile match in an analogous manner that test value 814 and test operator 806 specify which values match as described above. Correlation adjustment 814 represents an amount by which the correlation score is adjusted.

It may be helpful to consider the following example. Suppose that the subject system information item is a graphics card installed in client computer device 102. In the profile of client computer device 102, item type 704 can specify that the subject system information item (e.g., represented by system information record 702) represents an installed graphics card. In addition, value 706 can specify the make of, model of, and the version and revision of firmware installed in the graphics card of client computer device 102.

Item type 802 (FIG. 8), test value 804, and test operator 806 of correlation record 800 collectively determine whether correlation record 800 matches the subject system information item. For example, correlation record 800 can match graphics card system information items for a given make and model of graphics card with at least a predetermined version of firmware installed. In this illustrative example, the graphics card is a high-end graphics card and the firmware version indicates that the firmware has been updated recently. Accordingly, the user of client computer device 102 is presumed to value high performance in computer graphics rendering and to be conscientious about maintaining that performance by keeping the firmware up-to-date. In addition, the user can be presumed to be reasonably skilled in computer maintenance as the user has upgraded hardware firmware, something that not many computer users do on a regular basis.

The reference profile may or may not have exactly the same make and model of graphics card of the make and model with the appropriate version of firmware installed, but similarities 808 allow other makes and models of graphics cards to be considered similar and to therefore influence the correlation score. In this illustrative example, the reference profile includes an item of system information representing a different graphics card, but one that is also high-end and that has recently updated firmware. Reference value 810 and reference operator 812 collectively specify that this system information item matches similarity 808 and a system information record 702 matched by item type 802, test value 804, and test operator 806 correlates by a measure indicated in correlation adjustment 814.

In some embodiments, correlation adjustment 814 can be negative, suggesting inverse correlation. For example, if the reference computer device included a low-end, OEM graphics chip set in which the firmware has never been updated, correlation adjustment 814 can be negative to indicate that, not only is client computer device 102 not similar to the reference computer device, client computer device 102 is actually different from the reference computer device in a substantial way.

There may, of course, be many different items of system information that suggest professional interests, including work-related software, and various work-related web sites, each of which is considered to suggest a professional focus. Some items will have far more weight as an identifier of professional interests than others in light of the work-related reference profile of the highly regarded employee, which is the desired profile. As an example, if the reference profile is one with a large record of visits to the online edition of Oil and Gas Journal, any visits found on client computer device 102 to the same journal will be given significant weight in the profile created of client computer device 102. Many items may require careful adjustments to improve accuracy of comparison with the reference profile.

When the loop process 406-414 is complete because there are no more system information items to compare to the reference profile and therefore no further adjustments to be made to the correlation score, processing by device profile logic 524 according to logic flow diagram 210, and therefore step 210 (FIG. 2), completes. The final correlation score is the result of cumulative adjustments made to the correlation score initialized as neutral in step 404.

The resulting correlation score represents a degree of similarity between computer devices of two people and is therefore representative of a measure of similarity between the users of those computer devices.

Server computer 106 is shown in greater detail in FIG. 5. Server 106 includes one or more microprocessors (collectively referred to as CPU 502) that retrieve data and/or instructions from memory 504 and execute retrieved instructions in a conventional manner. Memory 504 can include generally any computer-readable medium including, for example, persistent memory such as magnetic and/or optical disks, ROM, and PROM and volatile memory such as RAM.

CPU 502 and memory 504 are connected to one another through a conventional interconnect 506, which is a bus in this illustrative embodiment and which connects CPU 602 and memory 504 to network access circuitry 512. Network access circuitry 512 sends and receives data through computer networks such as wide area network 104 (FIG. 1).

A number of components of server 106 are stored in memory 504. In particular, web server logic 520 and web application logic 522, including device profile logic 524, are all or part of one or more computer processes executing within CPU 602 from memory 504 in this illustrative embodiment but can also be implemented using digital logic circuitry.

Web server logic 520 is a conventional web server. Web application logic 522 is content that defines one or more pages of a web site and is served by web server logic 520 to client devices such as client computer device 102. The one or more pages of a web site served by web application logic 522 can include both static and dynamic content. The dynamic content is to be executed by web browser 620 (FIG. 6) of client computer device 102, either directly or through a plug-in such as plug-ins 622A-C. Device profile logic 524 (FIG. 5) is a part of web application logic 522 that creates a profile of client computers in the manner described above.

Client computer device 102 is a personal computing device and is shown in greater detail in FIG. 6. Client computer device 102 includes one or more microprocessors 602 (collectively referred to as CPU 602) that retrieve data and/or instructions from memory 604 and execute retrieved instructions in a conventional manner. Memory 604 can include generally any computer-readable medium including, for example, persistent memory such as magnetic and/or optical disks, ROM, and PROM and volatile memory such as RAM.

CPU 602 and memory 604 are connected to one another through a conventional interconnect 606, which is a bus in this illustrative embodiment and which connects CPU 602 and memory 604 to one or more input devices 608, output devices 610, and network access circuitry 612. Input devices 608 can include, for example, a keyboard, a keypad, a touch-sensitive screen, a mouse, a microphone, and one or more cameras. Output devices 610 can include, for example, a display—such as a liquid crystal display (LCD)—and one or more loudspeakers. Network access circuitry 612 sends and receives data through computer networks such as wide area network 104 (FIG. 1).

A number of components of client computer device 102 are stored in memory 604. In particular, web browser 620 is all or part of one or more computer processes executing within CPU 602 from memory 604 in this illustrative embodiment but can also be implemented using digital logic circuitry. As used herein, "logic" refers to (i) logic implemented as computer instructions and/or data within one or more computer processes and/or (ii) logic implemented in electronic circuitry. Web browser plug-ins 622A-C are each all or part of one or more computer processes that cooperate with web browser 620 to augment the behavior of web browser 620. The manner in which behavior of a web browser is augmented by web browser plug-ins is conventional and known and is not described herein.

It should be understood that in a different embodiment the job applicant provides evidence of the usage history and performance capability profile, including network activities and the hardware and software, of his work computer and/or home computer not through a wide area network but by providing a physical record, including a copy of the job applicant's computer drives. In yet another embodiment, the job applicant provides evidence of the usage history and performance capability profile of his work computer and/or home computer via human resources software other than a browser plug-in which the applicant downloads from the human resources department or installs on the client computer device 102 from physical storage media.

And, in another embodiment a profile of the user's computer device is compared not to a desirable profile but to an undesirable profile, including that of a person known to exhibit antisocial, unethical or criminal characteristics.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A computer system comprising:
    at least one processor;
    a computer readable medium that is operatively coupled to the processor;
    network access circuitry that is operatively coupled to the processor; and
    comparison logic (i) that executes at least in part in the processor from the computer readable medium and (ii) that, when executed, causes the computer system to determine similarity of a test person to a reference person by at least:
        sending logic to a test computer device that, when executed by the test computer device, generates one or more data elements representing characteristics of the test computer device;
        receiving system information pertaining to the test computer device that has been used by the test person, wherein the system information includes the one or more data elements representing characteristics of the test computer device selected from a group consisting essentially of: a hardware component, a hardware configuration, a software component, a software configuration, and a usage of the test computer device;
        identifying one or more corresponding items of system information of a reference computer device used by the reference person, wherein the corresponding items each correspond to at least one of the data elements representing characteristics of the test computer device;
        for each of the corresponding items:
            comparing the corresponding item to the at least one data element to determine a degree of similarity between the corresponding item and the at least one data element; and
            adjusting a correlation score according to the degree of similarity; and
        determining a measure of similarity between the test person and the reference person according to the adjusted correlation score;
        wherein identifying comprises determining that each of one or more predetermined device profile correlation rules applies to both (i) at least one of the items of data representing characteristics of the test computer device and (ii) at least one of the items of system information of a reference computer device.

2. The computer system of claim 1 wherein each of the one or more predetermined device profile correlation rules specifies the degree of similarity between data elements and items of system information to which the predetermined device profile correlation rule applies.

3. The computer system of claim 1 wherein each of the one or more predetermined device profile correlation rules defines one or more data elements to which the predetermined device profile correlation rule applies by specifying a type of item of data element, a test value of a data element, and a test operation for comparison of the test value.

4. The computer system of claim 1 wherein the comparison logic causes the computer to determine the similarity of a test person to a reference person by at least also:
    sending logic to the test computer that, when executed by the test computer, generates the one or more items of data representing characteristics of the test computer device.

5. A non-transitory computer-readable medium useful in association with a computer which includes one or more processors and a memory, the computer readable medium including computer instructions which are configured to cause the computer, by execution of the computer instructions in the one or more processors from the memory, to determine similarity of a test person to a reference person by at least:
    receiving an accumulation of single reversible hashes that represent multiple items of system information pertaining to a test computer device that has been used by the test person, wherein each single reversible hash includes multiple reversible hashes of data elements representing characteristics of the test computer device, each characteristic selected from a group consisting essentially of: a hardware component, a hardware configuration, a software component, a software configuration, and a usage of the test computer device;

parsing each single reversible hash into its constituent multiple reversible hashes;

parsing the constituent multiple reversible hashes;

initializing a correlation score representing a measure of correlation between the test computer device and a reference computer device associated with the reference person;

identifying, for each of the constituent multiple reversible hashes, one or more corresponding items of system information of the reference computer device, wherein the corresponding items each correspond at least one of the data elements representing characteristics of the test computer device;

for each of the corresponding items:
  comparing the corresponding item to the at least one data element to determine a degree of similarity between the corresponding item and the at least one data element; and
  adjusting a correlation score according to the degree of similarity; and
  determining a measure of similarity between the test person and the reference person according to the adjusted correlation score.

6. The nontransitory computer readable medium of claim 4 wherein identifying comprises:
  determining that each of one or more predetermined device profile correlation rules applies to both (i) at least one of the data elements representing characteristics of the test computer device and (ii) at least one of the items of system information of a reference computer device.

7. The nontransitory computer readable medium of claim 6 wherein each of one or more predetermined device profile correlation rules specifies the degree of similarity between data elements and items of system information to which the predetermined device profile correlation rule applies.

8. The nontransitory computer readable medium of claim 6 wherein each of the one or more predetermined device profile correlation rules defines one or more data elements to which the predetermined device profile correlation rule applies by specifying a type of data element, a test value of a data element, and a test operation for comparison of the test value.

9. The nontransitory computer readable medium of claim 4 wherein the computer instructions are configured to cause the computer, by execution of the computer instructions in the one or more processors from the memory, to determine the similarity of a test person to a reference person by at least also:
  sending logic to the test computer that, when executed by the test computer, generates the one or more items of data representing characteristics of the test computer device.

10. A non-transitory computer-readable medium useful in association with a computer which includes one or more processors and a memory, the computer readable medium including computer instructions which are configured to cause the computer, by execution of the computer instructions in the one or more processors from the memory, to determine similarity of a test person to a reference person by at least:
  sending logic to a test computer device that, when executed by the test computer device, generates one or more data elements representing characteristics of the test computer device;
  receiving system information pertaining to the test computer device that has been used by the test person, wherein the system information includes the one or more data elements representing characteristics of the test computer device selected from a group consisting essentially of: a hardware component, a hardware configuration, a software component, a software configuration, and a usage of the test computer device;
  identifying one or more corresponding items of system information of a reference computer device used by the reference person, wherein the corresponding items each correspond to at least one of the data elements representing characteristics of the test computer device;
  for each of the corresponding items:
    comparing the corresponding item to the at least one data element to determine a degree of similarity between the corresponding item and the at least one data element; and
    adjusting a correlation score according to the degree of similarity; and
    determining a measure of similarity between the test person and the reference person according to the adjusted correlation score.

11. The nontransitory computer readable medium of claim 10 wherein identifying comprises determining that each of one or more predetermined device profile correlation rules applies to both (i) at least one of the items of data representing characteristics of the test computer device and (ii) at least one of the items of system information of a reference computer device.

12. The nontransitory computer readable medium of claim 11 wherein each of the one or more predetermined device profile correlation rules specifies the degree of similarity between data elements and items of system information to which the predetermined device profile correlation rule applies.

13. The nontransitory computer readable medium of claim 11 wherein each of the one or more predetermined device profile correlation rules defines one or more data elements to which the predetermined device profile correlation rule applies by specifying a type of item of data element, a test value of a data element, and a test operation for comparison of the test value.

14. The nontransitory computer readable medium of claim 10 wherein the computer instructions are configured to cause the computer, by execution of the computer instructions in the one or more processors from the memory, to determine the similarity of a test person to a reference person by at least also:
  sending logic to the test computer that, when executed by the test computer, generates the one or more items of data representing characteristics of the test computer device.

* * * * *